United States Patent [19]

Malcolm

[11] 4,202,935
[45] May 13, 1980

[54] DEFERRED ACTION DRY CELL BATTERY

[76] Inventor: Alexander R. Malcolm, Five Hamiltonian Apartments, Middlesex, N.J. 08846

[21] Appl. No.: 32,358

[22] Filed: Apr. 23, 1979

[51] Int. Cl.² .................................................. H01M 6/00
[52] U.S. Cl. ........................................ 429/48; 429/110
[58] Field of Search ................. 429/113, 48, 67, 110

[56] References Cited

U.S. PATENT DOCUMENTS

| | | | |
|---|---|---|---|
| 515,432 | 2/1894 | Hubbell | 429/110 |
| 541,350 | 6/1895 | Glasgow | 429/113 |
| 1,402,224 | 1/1922 | French | 429/110 |
| 1,407,035 | 2/1922 | Huntley | 429/113 |
| 3,228,801 | 1/1966 | Snyder | 136/113 |
| 3,332,804 | 7/1967 | Zaromb | 136/90 |
| 3,357,864 | 12/1967 | Huber | 429/113 |
| 3,762,959 | 10/1973 | McCoy | 429/67 X |

*Primary Examiner*—Charles F. LeFevour
*Attorney, Agent, or Firm*—Lerner, David, Littenberg & Samuel

[57] ABSTRACT

A dry cell battery has a switch for selectively activating and deactivating the battery.

21 Claims, 5 Drawing Figures

DEFERRED ACTION DRY CELL BATTERY

FIELD OF THE INVENTION

The present invention relates generally to a deferred action dry cell battery, and, more particularly, to such a battery which may be deactivated after its initial activation.

BACKGROUND OF THE INVENTION

Conventional primary cell batteries produce electric current through a chemical reaction. In particular, an oxidation-reduction reaction is carried out in such a way that its driving force produces an electric potential. The oxidation-reduction reaction is achieved by providing an oxidizing agent and a reducing agent which is separated from the oxidizing agent. The oxidizing agent removes electrons from one electrode and the reducing agent gives electrons to another electrode, the flow of current through the battery being carried by ions. A common dry cell battery is one type of primary cell battery.

The common dry cell battery comprises a zinc cylinder which acts as one electrode and contains a suitable electrolyte, such as a paste of ammonium chloride ($NH_4Cl$), zinc chloride ($ZnCl_2$), water ($H_2O$) and diatomaceous earth or some other filler. A carbon rod and a surrounding paste, which includes a mixture of maganese dioxide ($MnO_2$) and carbon particles, functions as the other electrode.

Deferred action dry cell batteries have been known for many years. One object of a deferred action dry cell battery is to prevent the battery from deteriorating and becoming inoperable prior to use as a result of a secondary chemical reaction between the electrolyte and the electrodes of the battery.

In one type of deferred action battery, the electrolyte is stored in a first compartment while the electrodes are housed in a second compartment. When the battery is to be activated, the electrolyte is transferred from the first compartment to the second compartment. The provision of two separate compartments is, however, undesirable because it increases the overall size of the battery. Increasing the size of the battery is disadvantageous because it can result in increased construction and shipping costs. If the size of the battery is increased, there is also a possibility that the battery will not be compatible with electrical devices designed to accept a standard-sized battery.

Another type of deferred action dry cell battery is manufactured with the electrolyte and the electrodes in a single compartment, a chemically inactive liner being interposed between the electrolyte and the electrodes to prevent premature activation of the battery. The battery is activated by removing the liner to expose the electrodes to the electrolyte. Huntley U.S. Pat. No. 1,407,035 and Zaromb U.S. Pat. No. 3,332,804 disclose deferred action batteries employing such a liner.

The deferred action battery disclosed in the Huntley patent utilizes a liner which in its inactive position is coiled inside of a zinc can, the zinc can acting as an electrode of the battery. The liner overlaps itself within the zinc can so as to shield the zinc can from an electrolyte solution contained therein. In order to activate the battery, the zinc can is rotated to draw the liner out of the zinc can through an aperture or slot therein. The rotation of the zinc can coils the liner around the outside of the zinc can, thus physically removing at least a portion of the liner which shields the zinc can from the electrolyte when the battery is inactive. By making the liner sufficiently stiff, it may be reinserted between the zinc can and the electrolyte by rotating the zinc can in an opposite direction. The movement of the liner through the aperture or slot, which extends along the entire length of the battery, creates sealing problems which could result in the loss or drying out of the electrolyte.

The Zaromb patent discloses a deferred action battery comprising a plurality of radial cell compartments, each of which is enclosed by a sealing gasket and by a pair of thin coils covering the anode side and the cathode side of bipolar electrodes. The compartments are filled with a suitable electrolyte which is normally maintained out of contact with the electrodes by the foils. To activate the battery, a central shaft is rotated with respect to the radial cell compartments until all of the foils are withdrawn from the respective compartments to expose the electrodes to the electrolyte. The physical withdrawal of the foils from the radial compartments causes sealing problems. In addition, the foils do not appear to be designed for reinsertion between the electrodes and the electrolyte so as to deactivate an activated battery.

SUMMARY OF THE INVENTION

The new and improved deferred action dry cell battery of the present invention overcomes the problems and disadvantages of the prior art deferred action batteries described above. In particular, the deferred action battery of the present invention includes a casing having a chamber formed therein. At least one electrode is contained in the chamber substantially adjacent to the casing. The chamber also contains a suitable electrolyte.

In accordance with the invention, each of the electrodes has an associated shield which is movable relative to its corresponding electrode. When the battery is deactivated, each of the shields is interfaced with its respective electrode to prevent the electrodes from coming into contact with the electrolyte. The battery is activated by the relative movement of each of the shields with respect to its corresponding electrode, until all of the electrodes are exposed to the electrolyte. Inasmuch as each of the shields is permanently and completely maintained within the annular chamber of the battery during any such movement, serious sealing problems are substantially alleviated.

Once activated, the battery of the present invention can be deactivated by moving the shields until they once again interface with the electrodes. Accordingly, the battery can be repeatedly and selectively activated and deactivated. Indicia may be provided on the battery to indicate when it is activated and deactivated.

BRIEF DESCRIPTION OF THE DRAWINGS

For a more complete understanding of the invention, reference may be had to the following description of an exemplary embodiment taken in conjunction with the accompanying figures of the drawings, in which.

DESCRIPTION OF AN EXEMPLARY EMBODIMENT

Figure 1:
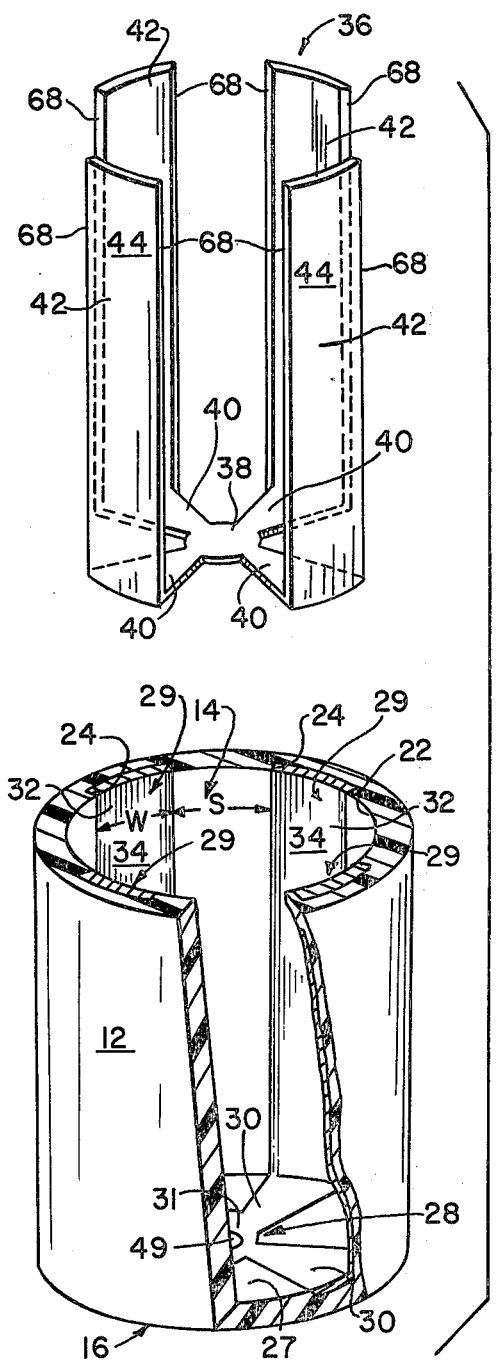
FIG. 1 is a partial exploded view of an exemplary embodiment of a dry cell battery constructed in accordance with the present invention, portions of the battery being broken away to facilitate consideration.
Figure 2:
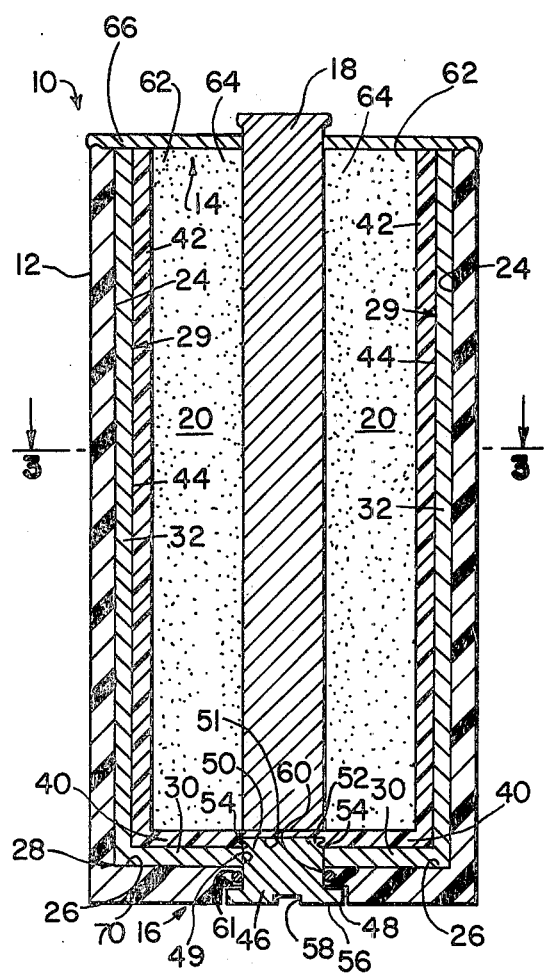
FIG. 2 is a longitudinal cross-sectional view of the battery illustrated in FIG. 1.
Figure 3:
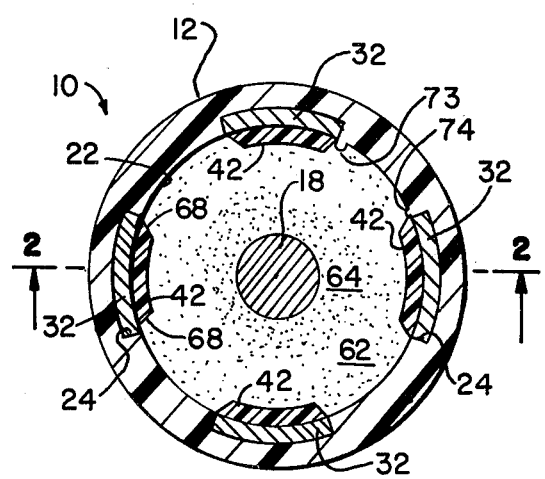
FIG. 3 is a cross-sectional view, taken along line 3—3 of FIG. 2 and looking in the direction of the arrows, showing the battery in a deactivated state.
Figure 4:
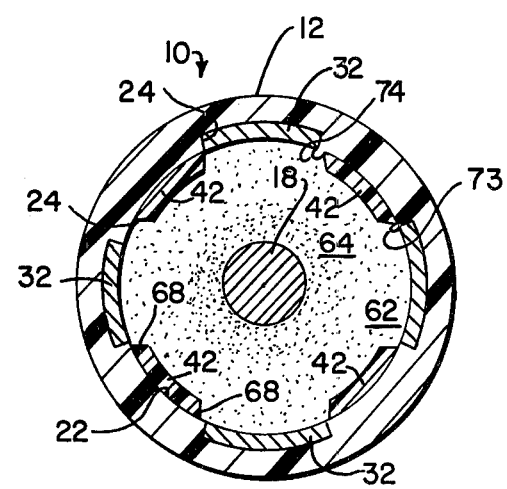
FIG. 4 is a cross-sectional view similar to that of FIG. 3, except that the battery is shown in an activated state.
Figure 5:
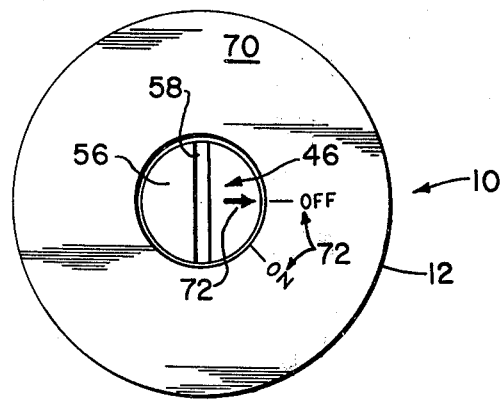
FIG. 5 is a bottom view of the battery illustrated in FIG. 2.

Referring to FIGS. 1-5, there is shown a battery 10 which includes a cylindrical casing 12 having an open end 14 and a closed end 16. A carbon rod 18 extends coaxially within the casing 12 so as to form a generally annular chamber 20 between the casing 12 and the carbon rod 18.

An inner circumferential wall 22 of the casing 12, which may be manufactured from any suitable plastic, is provided with four longitudinally extending slots 24 which are circumferentially spaced from each other. All of the slots 24 have the same circumferential width (W), the circumferential spacing (S) between each pair of adjacent slots being substantially equal to or slightly greater than the circumferential width (W) of the slots 24. Each of the slots 24 communicates with a corresponding one of four radially extending recesses 26 provided in a longitudinally inner surface 27 of the closed end 16 of the casing 12. The recesses 26 have a generally triangular radial cross-sectional shape.

The annular chamber 20 houses a zinc electrode 28 including four arms 29 which are attached to a central ring 31. Each of the arms 29 includes a radially extending flat electrode plate 30 and a longitudinally extending curved electrode plate 32, which is supported by the radially outer end of the flat electrode plate 30. The flat electrode plates 30 have a radial cross-sectional shape which generally matches the triangular radial cross-sectional shape of the recesses 26 so that each of the flat electrode plates 30 can be received in a corresponding one of the recesses 26. Each of the curved electrode plates 32 is adapted for reception in a corresponding one of the slots 24. A radially inner surface 34 of each of the curved electrode plates 32 has a radius of curvature which is substantially equal to the radius of curvature of the inner circumferential surface 22 of the casing 12.

A rotatable shield assembly 36 is also housed in the annular chamber 20. The shield assembly 36 includes a central disk 38, four flat shield plates 40 which extend radially outwardly from the disk 38, and four curved shield plates 42, each of which of extends longitudinally upwardly from the radially outer end of a corresponding one of the flat shield plates 40. The radius of the disk 38 is at least equal to the outer radius of the ring 31 of the electrode 28. The flat shield plates 40 have the same general size, shape, and arrangement as the flat electrode plates 30, so that the flat shield plates 40 are capable of completely covering and uncovering all of the flat electrode plates 30 simultaneously. The curved shield plates 42 are sized, shaped, and arranged in such a manner that they can completely and simultaneously cover and uncover all of the curved electrode plates 32 concurrently with the covering and uncovering, respectively, of the flat electrode plates 30 by the flat shield plates 40. In addition, a radially outer surface 44 of each of the curved electrode plates 42 has a radius of curvature which is substantially equal to the radius of curvature of the radially inner surface 34 of the curved electrode plates 32. In order to increase the rigidity of the curved shield plates 42, they may be joined together at their upper longitudinal ends.

A rotatable capstan 46 extends through an opening 48 in the closed end 16 of the casing 12 and an opening 49 in the ring 31. A longitudinally inner portion 50 of the capstan 46 is received in a recess 51 in the disk 38 of the shield assembly 36. A plurality of depressions 52 is provided in the longitudinally inner portion 50 of the capstan 46. Each of the depressions 52 receives a corresponding one of a plurality of resilient projections 54 which extend radially inwardly into the recess 51 formed in the disk 38 of the shield assembly 36. The projections 54 cooperate with the depressions 52 so as to positively attach the capstan 46 to the shield assembly 36 in such a manner that the shield assembly 36 rotates in response to the rotation of the capstan 46. A longitudinally outer end 56 of the capstan 44 has a groove 58 adapted to receive an appropriate object, such as screwdriver, coin, fingernail, or some similar object, for manually rotating the capstan 46, which is preferably metallic so that it may function also as a contact for the battery 10.

An O-ring 60 or a similar resilient sealing device, received in an annular channel 61 which communicates with the opening 48, seals the opening 48 in the closed end 16 of the casing 12 to prevent the inadvertent loss and drying out of an electrolyte 62 and a battery mix 64 contained in the annular chamber 20. The electrolyte 62, which is located in the radially outermost portion of the annular chamber 20, may be a paste consisting of ammonium chloride ($NH_4Cl$), zinc chloride ($ZnCl_2$), water ($H_2O$) and diatomaceous earth or some other appropriate filler. The battery mix 64, which may be a paste of manganese dioxide ($MnO_2$) and carbon particles, is interposed between the carbon rod 18 and the electrolyte 62. A conventional top 66 seals the open end 14 of the casing 12.

When the battery 10 is deactivated, each of the flat shield plates 40 and the curved shield plates 42 interfaces with a corresponding one of the flat electrode plates 30 and curved electrode plates 32, respectively, so as to prevent the electrolyte 62 from contacting any of the electrodes 28. To activate the battery 10, the shield assembly 36 is rotated in a counterclockwise direction until each of the electrodes 28 is exposed to the electrolyte 62. Once activated, the battery 10 may be deactivated by the reverse rotation of the shield assembly 36. So as to facilitate the rotation of the shield assembly 36, both edges 68 of each of the flat shield plates 40 and the curved shield plates 42 are beveled. The beveled edges 68 also function as wipers for wiping the electrolyte 62 away from the flat electrode plates 30 and the curved electrode plates 32 when the shield assembly 36 is rotated to deactivate an activated battery. The shield assembly 36 can be made from any suitable chemically inactive material having sufficient rigidity to physically move the electrolyte 62. Examples of suitable materials include both filled and unfilled plastics of acrylic, hi-impact styrene, polyester, cellulose acetate butyrate, polymers of unsaturated flourine compounds, polyethylene, polypropylene, and ethylene-propylene copolymers.

The capstan 46 and a longitudinally outer surface 70 of the closed end 16 of the casing 12 are provided with suitable markings 72 for indicating when the battery 10 is activated and deactivated. A rigid retainer 73 projects radially inwardly from the inner circumferential wall 22 of the casing 12 on one side of one of the slots 24 to limit the rotation of the shield assembly 36. A resilient stop 74 extends radially inwardly from the inner circumferential wall of the casing 12 on an adjacent side of an adjacent one of the slots 24 to prevent the inadvertent clockwise rotation of the shield assembly 36 after the battery 10 has been activated. The retainer 73 and the stop 74 cooperate so as to provide a further indication that the shield assembly 36 has been rotated an appropriate distance to either completely cover or uncover the electrode 28.

It will be understood that the embodiment described herein is merely exemplary and that a person skilled in the art may make many variations and modifications without departing from the spirit and scope of the invention. For instance, the shape, number, and location of the zinc electrode 28 may be varied as long as each of the zinc electrodes or the other electrode of the battery has an associated shield which is movable relative thereto. Also, to ensure against premature activation, a layer of microcrystalline wax or similar sealing compound may be provided adjacent to the inner circumferential wall 22 of the casing 12 to seal the shield assembly 36 and the electrode 28 until the initial activation of the battery 10, at which time the seal is permanently broken. All such modifications and variations are intended to be included within the scope of the invention as defined in the appended claims.

What is claimed is:

1. A battery, comprising:
   a casing;
   a pair of electrode means positioned within said casing, said electrode means being spaced from each other so as to form a chamber therebetween;
   an electrolyte contained in said chamber; and
   shield means movable relative to one of said electrode means for shielding said one electrode means from said electrolyte when said shield means is in a first position relative to said one electrode means and for exposing said one electrode means to said electrolyte when said shield means is in a second position relative to said one electrode means, said shield means being permanently and completely maintained within said chamber during the movement of said shield means from said first position to said second position.

2. A battery according to claim 1, wherein said one electrode means includes a plurality of first plates positioned adjacent said casing and said shield means includes a plurality of second plates, each of said second plates being associated with a corresponding one of said first plates to form a plurality of pairs of plates, the plates of each of said pairs of plates being movable relative to each other in such a manner that the first plate is shielded from said electrolyte by the second plate when said second plate is in a first position relative to said first plate and said first plate is exposed to said electrolyte when said second plate is in a second position relative to said first plate.

3. A battery according to claim 2, wherein said first plates are made from zinc.

4. A battery according to claim 2, wherein said second plates are made from plastic.

5. A battery according to claim 4, wherein said plastic is selected from the group consisting of filled or unfilled acrylic, hi-impact styrene, polyester, cellulose acetate butyrate, polymers of unsaturated flourine compounds, polyethylene, polypropylene, and ethylene-propylene copolymers.

6. A battery according to claim 2, wherein said first plates are stationary and said second plates are movable.

7. A battery according to claim 6, further comprising switch means for moving said second plates in response to the movement of said switch means.

8. A battery according to claim 7, wherein said switch means is a capstan rotatably positioned in an opening in one end of the battery, one end of said capstan being attached to said second plates in such a manner that said second plates rotate in response to the rotation of said capstan.

9. A battery according to claim 8, wherein the opposite end of said capstan includes recess means cooperating with an object for rotating said capstan.

10. A battery according to claim 9, wherein said capstan is metallic.

11. A battery according to claim 9, wherein said opposite end of said capstan and said one end of said battery are provided with indicia means for indicating the position of said second plates relative to said first plates.

12. A battery according to claim 8, wherein said capstan and second second plates are rotatable both in a clockwise direction and a counterclockwise direction.

13. A battery according to claim 12, wherein each of said second plates includes wiper means for wiping said electrolyte away from said first plates when each of said second plates is rotated from its second position to its first position.

14. A battery according to claim 13, wherein said wiper means is a beveled edge on each of said second plates.

15. A battery according to claim 6, wherein the inner surface of said casing is provided with a plurality of recesses, each of said recesses receiving a corresponding one of said first plates.

16. A battery according to claim 15, wherein the depth of each of said recesses is substantially equal to the thickness of the corresponding one of said first plates received therein.

17. A battery according to claim 16, wherein the width of each of said recesses is substantially equal to the width of the corresponding one of said first plates received therein.

18. A battery according to claim 17, wherein the width of said second plate of each of said pairs of plates is at least equal to the width of its associated first plate.

19. A battery according to claim 1, further comprising switch means actuated externally of the battery for moving said shield means back and forth between said first position and said second position, whereby the battery may be selectively activated or deactivated.

20. A battery according to claim 19, further comprising indicia means for indicating when the battery is activated and deactivated.

21. A battery, comprising:
   an outer casing;
   a first electrode positioned within said casing so as to form a generally annular chamber between said casing and said first electrode;
   a plurality of second electrodes positioned within said chamber substantially adjacent to said casing;
   an electrolyte contained in said chamber substantially adjacent to said second electrodes;
   a plurality of shields positioned in said chamber, each of said shields being associated with a corresponding one of said second electrodes and being rotatable relative thereto so that said corresponding one of said second electrodes is shielded from said electrolyte by its associated shield when said associated shield is in a first position relative to said corresponding one of said second electrodes and said corresponding one of said second electrodes is exposed to said electrolyte when said associated shield is in a second position relative to said corresponding one of said second electrodes; and means for simultaneously and collectively rotating said shields back and forth between their first and second positions without physically removing them from said chamber.

* * * * *